(12) United States Patent
Jones

(10) Patent No.: US 10,088,696 B2
(45) Date of Patent: Oct. 2, 2018

(54) CLOTH ACCESSORY

(71) Applicant: Darren Jones, American Fork, UT (US)

(72) Inventor: Darren Jones, American Fork, UT (US)

(73) Assignee: Alpine Innovations LLC, Lehi, UT (US)

( * ) Notice: Subject to any disclaimer, the term of this patent is extended or adjusted under 35 U.S.C. 154(b) by 0 days.

(21) Appl. No.: 14/875,529

(22) Filed: Oct. 5, 2015

(65) Prior Publication Data

US 2016/0187674 A1 Jun. 30, 2016

Related U.S. Application Data

(63) Continuation of application No. 14/509,945, filed on Oct. 8, 2014, now abandoned, which is a continuation of application No. 14/065,238, filed on Oct. 28, 2013, now abandoned, which is a continuation of application No. 13/960,474, filed on Aug. 6, 2013, now abandoned, which is a continuation of application No. 13/442,476, filed on Apr. 9, 2012, now abandoned, which is a continuation of
(Continued)

(51) Int. Cl.
| | | |
|---|---|---|
| A47L 13/16 | (2006.01) | |
| A47L 25/00 | (2006.01) | |
| G02C 13/00 | (2006.01) | |
| A45C 11/00 | (2006.01) | |
| A45C 15/00 | (2006.01) | |
| A47L 13/51 | (2006.01) | |
| B08B 1/00 | (2006.01) | |
| G02B 27/00 | (2006.01) | |
| A45C 11/32 | (2006.01) | |

(52) U.S. Cl.
CPC .......... *G02C 13/006* (2013.01); *A45C 11/00* (2013.01); *A45C 15/00* (2013.01); *A47L 13/16* (2013.01); *A47L 13/51* (2013.01); *A47L 25/00* (2013.01); *B08B 1/00* (2013.01); *G02B 27/0006* (2013.01); *A45C 11/329* (2013.01)

(58) Field of Classification Search
CPC .......... A47L 13/16; A47L 25/00; B08B 11/00
See application file for complete search history.

(56) References Cited

U.S. PATENT DOCUMENTS

| 421,438 A | 2/1890 | Shailer |
|---|---|---|
| 1,599,769 A | 9/1926 | Jaynes |
| (Continued) | | |

FOREIGN PATENT DOCUMENTS

| GB | 304989 | * 1/1929 |
|---|---|---|
| GB | 304989 A | 1/1929 |
| WO | WO 2005/030024 A1 | 4/2005 |

*Primary Examiner* — Randall Chin
(74) *Attorney, Agent, or Firm* — Thorpe North & Western, LLP; David W. Osborne

(57) ABSTRACT

A cloth accessory and methods for the use thereof are disclosed and described. In one aspect, the cloth accessory may include a cover member forming an enclosure with a cavity therein, and a cloth attached to the cover member. The cloth may have a first configuration wherein the cloth is retracted substantially into the cover member, and a second configuration wherein the cloth is extended substantially out of the cover member without becoming detached therefrom.

26 Claims, 2 Drawing Sheets

Related U.S. Application Data application No. 12/784,222, filed on May 20, 2010, now Pat. No. 8,151,399, which is a continuation of application No. 12/243,815, filed on Oct. 1, 2008, now abandoned, which is a continuation of application No. 11/707,632, filed on Feb. 16, 2007, now abandoned, which is a continuation of application No. 11/048,103, filed on Jan. 31, 2005, now Pat. No. 7,178,193, which is a continuation of application No. 10/402,251, filed on Mar. 27, 2003, now Pat. No. 6,849,135.

(60) Provisional application No. 60/368,444, filed on Mar. 27, 2002.

(56) References Cited

U.S. PATENT DOCUMENTS

| | | | |
|---|---|---|---|
| 1,949,856 | A | 3/1934 | Blakeslee |
| 2,204,947 | A * | 6/1940 | Apfelbaum ............ A45D 44/00 15/147.1 |
| 2,233,157 | A | 2/1941 | Hermann et al. |
| 2,530,746 | A | 11/1950 | Wetherby |
| 2,554,630 | A | 5/1951 | Miller |
| 2,633,136 | A | 3/1953 | Nesvig |
| 3,350,736 | A | 11/1967 | Frazelle et al. |
| 3,369,651 | A | 2/1968 | Crowley |
| 4,232,808 | A | 11/1980 | Gray |
| 4,516,616 | A | 5/1985 | Fesler |
| 4,854,449 | A | 8/1989 | Fitzhugh |
| D307,199 | S | 4/1990 | Rojko et al. |
| 4,953,603 | A | 9/1990 | Holden |
| 5,009,327 | A | 4/1991 | Levison |
| 5,014,846 | A | 5/1991 | Walker et al. |
| 5,083,661 | A | 1/1992 | Burwell |
| 5,131,112 | A | 7/1992 | Cervini |
| D329,564 | S | 9/1992 | Levinson |
| 5,161,683 | A | 11/1992 | Smith |
| 5,172,839 | A | 12/1992 | Frisbie |
| 5,372,414 | A | 12/1994 | Lamonakis et al. |
| 5,398,424 | A | 3/1995 | Corcoran |
| 5,419,477 | A | 5/1995 | Verge |
| D382,756 | S | 8/1997 | Ryan |
| D388,273 | S | 12/1997 | Propper |
| 5,770,284 | A | 6/1998 | Logemann |
| 5,813,080 | A | 9/1998 | Hendren |
| D401,105 | S | 11/1998 | Dewees |
| 5,927,489 | A | 7/1999 | Carswell |
| 6,108,855 | A | 8/2000 | DeLeon |
| 6,131,232 | A | 10/2000 | Eddy et al. |
| 6,439,379 | B2 | 8/2002 | Taormina |
| D463,629 | S | 9/2002 | Black |
| D484,041 | S | 12/2003 | Favor |
| 6,849,135 | B2 | 2/2005 | Jones |
| 6,881,273 | B1 | 4/2005 | Oberman |
| 6,883,989 | B2 | 4/2005 | Kushner et al. |
| D537,288 | S | 2/2007 | Jones |
| 7,178,193 | B2 | 2/2007 | Jones |
| 7,370,754 | B2 | 5/2008 | Kushner |
| 7,413,614 | B2 | 8/2008 | Jones |
| 7,416,610 | B2 | 8/2008 | Jones |
| 7,442,259 | B2 | 10/2008 | Jones |
| 2001/0047534 | A1 | 12/2001 | Sandusky |
| 2003/0213080 | A1 | 11/2003 | Jones |
| 2007/0295359 | A1 | 12/2007 | Cherry |
| 2008/0011324 | A1 | 1/2008 | Jones |

* cited by examiner

CLOTH ACCESSORY

PRIORITY DATA

This application is a continuation of U.S. patent application Ser. No. 14/509,945, filed on Oct. 8, 2014, which is a continuation of U.S. patent application Ser. No. 14/065,238, filed on Oct. 28, 2013, which is a continuation of U.S. patent application Ser. No. 13/960,474, filed on Aug. 6, 2013, which is a continuation of U.S. patent application Ser. No. 13/442,476, filed on Apr. 9, 2012, which is a continuation of U.S. patent application Ser. No. 12/784,222, filed on May 20, 2010, now issued as U.S. Pat. No. 8,151,399, which is a continuation of U.S. patent application Ser. No. 12/243,815, filed on Oct. 1, 2008, which is a continuation of U.S. patent application Ser. No. 11/707,632, filed on Feb. 16, 2007, which is a continuation of application Ser. No. 11/048,103, filed Jan. 31, 2005, now issued as U.S. Pat. No. 7,178,193, which is a continuation of U.S. patent application Ser. No. 10/402,251, filed on Mar. 27, 2003, now issued as U.S. Pat. No. 6,849,135, which claims the benefit of U.S. Patent Application Ser. No. 60/368,444, filed Mar. 27, 2002, all of which are incorporated herein by reference.

BACKGROUND

A number of devices benefit from the use of a cloth or other absorbent device for cleansing or polishing. Particularly, those devices that employ one or more lenses, such as glasses, goggles, high power magnification scopes, cameras, binoculars, safety glasses, sunglasses, etc., require periodic, or even frequent cleaning and maintenance in order to maintain suitable visibility therethrough. This is especially true when such devices are used in an outdoor setting during certain activities, such as skiing, hiking, snow mobiling, fishing, hunting, motorcycling, and climbing, among others. In fact, the enjoyment, feasibility, and safety of many activities is often directly dependent on the use of various lens-bearing devices. For example, most hunting activities benefit from the use of a high powered magnifying scope, and skiing almost always requires the use of glasses or goggles. Further, safety glasses are required in most laboratory and industrial arts environments.

Proper maintenance and treatment of a lens-bearing device can be critical. In fact, a number of situations may arise where the lens-bearing device may require cleaning or treatment during an activity in which it is being used. While most lenses are best cleaned with a soft cloth such as a microfilament fabric, in order to avoid scratching, more often than not, due to inconvenience and a lack of forethought, no such cloth is available for use during the activity. Therefore, the lens will either remain dirty, perhaps impairing its function and posing a potential hazard, or being cleaned with whatever fabric is closest at hand, such as a portion of a shirt, coat, etc., which may lead to scratching.

As such, a suitable device for cleaning, or treating the lenses of a lens-bearing device, that is handy, convenient, inexpensive, and easy to use during a variety of activities and in various settings, continues to be sought.

SUMMARY OF THE INVENTION

Accordingly, the present invention provides a cloth accessory that is portable, handy, and convenient, for use in cleaning or treating a lens-bearing device. In some aspects, the accessory may be configured for use during an activity in which the lens-bearing device is being used. The cloth accessory generally includes a cover member and a cloth attached to the cover member such as to an inside surface of the cover member. In one aspect, the cover member may form an enclosure with a cavity therein, and the cloth may have a first configuration wherein it is retracted substantially into the cover member and a second configuration wherein it is extended substantially out of the cover member without becoming detached therefrom. In this manner, the cloth may be extended out of the cover member for use, and then replaced back inside the cover member for storage, until it is needed again.

The cover member may be made from a wide variety of materials, including both durable and soft materials. In one aspect, the cover member may be made of the same material as the cloth, and in fact, the cover member may be an extension of the cloth. Further, the cover member may have an attachment member that can be used for attachment to a lens-bearing device, or other device, such as a cover, case, pack, article of clothing, etc. As such, the cleaning and polishing device may be stored in a manner which allows it to be within quick and convenient access for use before, during, or after an activity.

During storage periods, the cloth member is pushed, rolled, or otherwise placed substantially into the cover member. When used, the cloth member is extended substantially out of the cover member, but has no risk of being dropped or lost, as it is attached to an inside portion of the cover member. In one aspect of the invention, the cover may be a soft pouch that becomes inverted upon retrieval and use of the cloth. In another aspect of the invention, the cloth may be of a soft and absorbent material, such as a micro fiber cloth. In yet another aspect, the cover may be of a protective material. Further, the cover may be equipped with an optional fastener that is used to close an opening in the cover through which the cloth is retrieved and stored.

In addition to the devices described herein, the present invention encompasses a method for cleaning or treating a lens-bearing device. Such a method includes providing a cloth accessory as disclosed herein, and contacting the lens of the lens-bearing device with the cloth in a manner sufficient to clean or treat the lens.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings, or may be learned by the practice of the invention.

DETAILED DESCRIPTION

Figure 1:
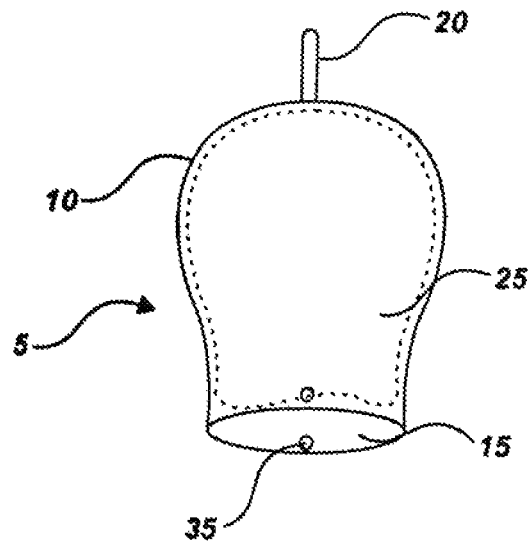
FIG. 1 is a side view of a cloth accessory in accordance with one embodiment of the invention, shown in a storage posture, having the cloth member retracted up into the cover member.

Before the present cloth accessory and accompanying methods of use and manufacture are disclosed and described, it is to be understood that this invention is not limited to the particular process steps and materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and, "the" include plural referents unless the context clearly dictates otherwise. Thus, for example, reference to "the material" or "a cloth" includes reference to one or more of such materials.

Definitions

In describing and claiming the present invention, the following terminology will be used in accordance with the definitions set forth below.

As used herein, "cloth" refers to any, flexible, absorbent, fabric that can be used for cleaning or polishing. In one aspect, the cloth may be made of micro fibers to reduce the incidence of scratching when used to clean or polish a lens-bearing device.

As used herein, "cover member" refers to a cover or container of a material that is capable of having a cloth attached thereto, and storing a cloth substantially therein, while allowing the cloth to be extendable therefrom for use. In one aspect, the cover may be of a flexible material that is durable and waterproof, such as neoprene.

As used herein, "attachment member" refers to a mechanism or method by which the cover member may be attached to another device, including without limitation, straps, loops, hooks, clasps, clips, snaps, etc.

As used herein, "fastener" refers to a structure or method which is capable of at least partially closing, and holding closed, the opening of a cover member. In some aspects, the opening may be entirely closed and in some aspects, made water tight. Examples of specific fasteners include without limitation, snaps, hooks, straps, cords, hook and loop fasteners (i.e. Velcro®), buttons, drawstrings, buckles, clasps, and zippers, among others.

As used herein, "plastic" refers to a rigid or semi-rigid polymeric material that can be extruded, molded, or cast into a number of different shapes. A wide variety of plastics are known to those of ordinary skill in the art, a number of which may be selected in order to provide a cover member with specifically desired characteristics.

Sizes, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 centimeter to about 5 centimeters" should be interpreted to include not only the explicitly recited values of about 1 centimeter to about 5 centimeters, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

THE INVENTION

The present invention provides a cloth accessory that is conveniently accessible for use in cleaning or treating a lens-bearing device. The configuration and portability of the device allow it to be conveniently used in cleaning or treating a lens-bearing device during an activity in which the lens-bearing device is used. Referring now to FIG. 1, is shown a cloth accessory 5, having a cover member 10, forming an enclosure with a cavity and an opening 15 for retrieving and inserting a cloth 25. The cloth is shown in a first configuration wherein the cloth is retracted substantially into the cover member and retained in a stored position. The cover member additionally has an attachment member 20 coupled to the cover member, for attaching or securing the cloth accessory to a lens-bearing device, a storage case therefore, an article of clothing, or other object. Notably, the cloth is attached, or fixed to the cover member at an attachment point (not shown) in order to prevent the cloth from becoming separated from the cover member. In this way, the cloth may not be dropped or lost during its use.

Figure 2:
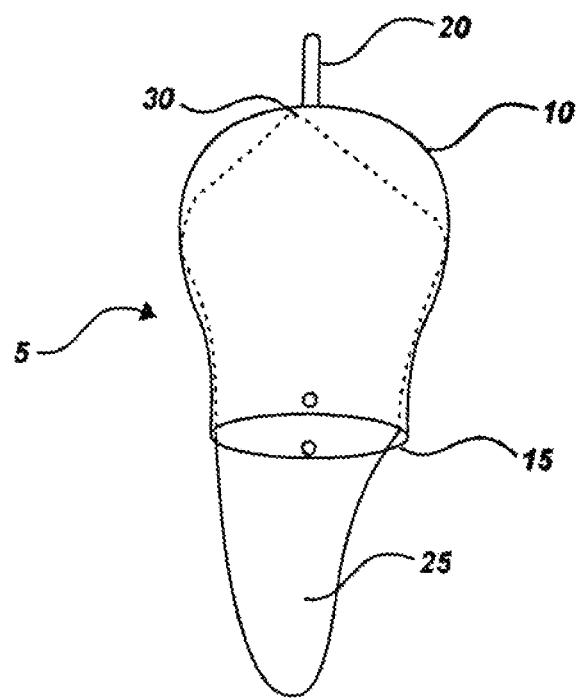
FIG. 2 is a side view of the cloth accessory shown in FIG. 1, having the cloth member extended out of the cover member, with the cover member in a non-inverted position.

Referring now to FIG. 2, is shown the cloth accessory 5, with the cloth 25 in a second configuration wherein the cloth is extended substantially out of the opening 15 of cover member 10. The cloth remains attached to an inside portion of the cover member at an attachment point 30. In some aspects of the present invention, the cloth may be used while extended in this configuration. This is especially true when the cover member is made of a rigid or semi-rigid material as more fully elaborated below.

Figure 3:
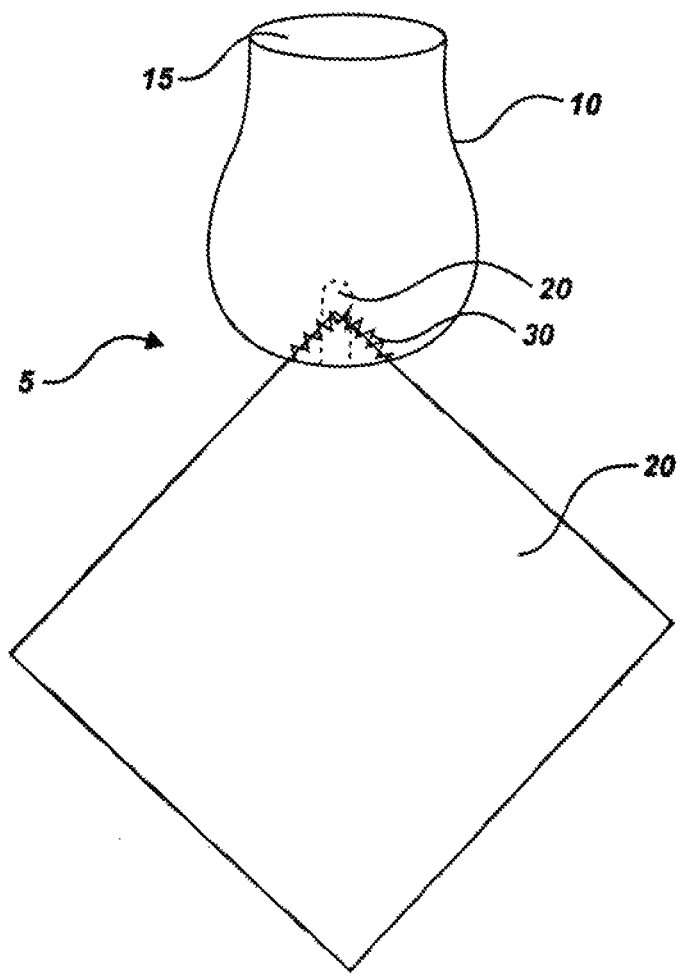
FIG. 3 is a side view of the cloth accessory of FIGS. 1 and 2 being ready for use, having the cloth member extended out of the cover member, and the cover member inverted, in accordance with one embodiment of the present invention.

Referring now to FIG. 3, is shown the cloth accessory 5, with the cloth also in a second configuration wherein the cloth 25 is extended substantially out of the opening 15 of cover member 10. In addition, the cover member is inverted to expose substantially the entire cloth. The cloth remains attached to the inside portion of the cover member the along attachment point 30, and because of the inverted state of the cover member, the attachment member 20 is now inside the inverted cover member. The cloth in this configuration may be used for cleaning or treating a lens-bearing device. Once the cloth has been used, it may be returned to the inside of the cover member reverting the cover member to its normal position, and either folding, rolling, or stuffing the cloth thereinto.

As will be recognized, the embodiment of FIG. 3 can be made possible, by having the cover member 10 be made of a soft and flexible material, and the embodiment of FIG. 2, can be used if the cover member is rigid or semi-rigid. The cover member may be made from a number of suitable materials as required in order to achieve a specific result or desired purpose. The cover member may also be made water proof, either by the nature of the material selected, or a treatment applied thereto, and can also be made otherwise resistant to outdoor elements in order to protect as well as house the cloth 25. As such, the cover member may be made of both durable (i.e. rigid or semi-rigid) and soft flexible materials. Examples of suitable soft or flexible materials include without limitation, fabrics, such as wool, cotton, polyester, rayon, fleece, and nylon, as well as polymeric materials, such as rubber, flexible plastics, neoprene, and vinyl. Further, natural materials, such as leather, or other skins may be used. Examples of durable (i.e. rigid or semi-rigid) materials include without limitation, plastics and other polymeric materials, metals, wood, etc. As will be recognized by one of ordinary skill in the art, most if not all of the above-recited materials will be suitable for printing or screening in order to accommodate specific designs or logos to be printed thereon.

The cover member opening 15 may optionally include a fastener 35, that is used to close or substantially close the opening and further aid in securing the cloth 25 when stored inside the cover member 10. A wide variety of fasteners and fastening mechanisms may be employed to close the opening, as required in order to provide a specific device capable of achieving a specific result. Examples of suitable fasteners include without limitation, snaps, buttons, drawstrings, hook and loop fasteners (i.e. Velcro®), zippers, and clasps. In one aspect, the fastener may be a hook and loop fastener. In another aspect, the fastener may be a snap. In yet another aspect, the fastener may be a drawstring. Many of these articles may be used either in connection with, or without, an optional flap or lid (not shown) that folds or rests over an outside portion of the cover member to close the opening. It will be appreciated that a lid will be the primary fastening mechanism for closing the opening when a rigid or semi-rigid material is used for the cover member.

In some aspects, the cover member 10 may be of a rigid or semi-rigid material in a multi-piece form. Such pieces may be hinged or clasped together in a manner like a locket, or other hinged case, which allows the pieces to open and expose the cloth 25 held in a first retracted configuration to be extended into the second or extended configuration. Further, it will be recognized that when a rigid or semi-rigid cover member with a lid is employed, that the lid will be attached to the cover member by one of a variety of hinging mechanisms, such as a hinge, strap, cord, etc. Notably, the pieces of such a cover member may be fastened together so as to remain closed, using one or more of the fasteners recited herein, the specific type of which may be selected by one of ordinary skill in the art to obtain a specific design or result. In one aspect, the multi-piece cover member may include a plurality of pieces hinged together. In another aspect, the number of hinged pieces may be two. In yet another aspect, the number of hinged pieces may be three or more.

Similarly, the attachment member 20 may take a variety of configurations or mechanisms that are capable of attaching the cloth accessory 5 to a desired item, such as a lens-bearing device, carrying case therefore, article of clothing, key chain, etc. In one aspect, the attachment member may be a simple loop of desired material and length. In this case, the loop is wound around a portion of the object to which the accessory 5 is being secured, and then the cover member is slipped through an open end of the loop and the loop pulled tight to take up any slack. The material used for such a loop may be elastic to further provide a tight attachment to the object. Those of ordinary skill in the art will recognize that a host of other specific devices and methods may be used to secure the accessory to a desired object, including without limitation, lanyards, clasps, straps, cords, snaps, clips, and buckles. However, in one aspect, the attachment member may be an elastic loop. In another aspect, the attachment member may be a cord.

The cloth 25 that is used in connection with the cover member 10 may be made of a wide variety of materials and fabrics that are suited to accomplishing a specific purpose, such as cleaning or treating the lens of a lens-bearing device without scratching it. Nearly any woven or non-woven fabrics may be used. Further, fabrics with a selected degree of absorbability may be used with some cloths being selected to be more absorbent than others. Examples include without limitation, cotton, polyester, and other cloths, microfiber cloths, super absorbent cloths or materials, such as chamois, and other natural or synthetic absorbent materials. In one aspect, the cloth may be a microfiber cloth. The cloth may additionally be configured to hold a variety of materials useful in treating lens-bearing devices, such as cleaning and anti-fog solutions, polishes, waxes, etc.

Furthermore, the cloth 25 may be of a variety of shapes and sizes. Circular, square, rectangular, triangular, hexagonal, and other custom designed shapes and geometrical configurations may be used. The only specific limitation on this aspect of the invention is that the cloth not be so big as to be unable to fit inside the cover member as indicated herein. In one aspect, the cloth may have a length that is sufficient to allow it to be useful for cleaning or treatment of a lens-bearing device when it is attached to the cover member at a point of attachment 30 that is substantially opposite the opening 15 of the cover member. In one aspect, such a length may be at least about twice the distance from the point of attachment to the opening. In another aspect, such a length may be at least about three or four times this distance.

Further, in one aspect, the cloth 25 may be attached to the inside portion (e.g., a portion of an inner or inside surface) of the cover member 10 at nearly any convenient point of attachment 30, using a variety of attachment mechanisms, which either render the cloth permanently fixed to the cover member, or removable from the cover member. As shown in FIG. 3, the cloth is attached near a central portion of the inside of the cover member. In fact, in one aspect, the point of cloth attachment may be inside the cover member at the same location as the attachment member 20 outside of the cover member. In this manner, the overall strength of the cloth attachment point may be improved while manufacture thereof may be simplified. Moreover, in one aspect, the cloth may not be attached to the cover member at all, but may rather be attached directly to the attachment member 20. In such an embodiment, the attachment member extends through a small hole made in the cover member. The cloth is then removably held in the cover member either by the frictional force of the cover member surrounding the attachment member extending therethrough, or may be removably or permanently held in place by one of the other attachment mechanisms set forth herein. For example, the cover member may be fused to the attachment member protruding therethrough.

While the point of attachment 30 location, substantially opposite the opening 15 may be advantageous in some embodiments, the point of attachment may be attached at a point much closer to the opening 15 when desired. In one aspect, the point of attachment may be right at the opening, or just within the opening. In other words, the point of attachment may be on the inside or inner surface of cover member at a point closer to the opening than a point substantially opposite the opening (e.g, "a point substantially opposite the opening" could be a central portion of the cover member, in some examples). Thus, the cloth could be attached or coupled to the inside surface at a point closer to the opening than a point closer to the central portion of the cover member, for instance. Such points of attachment may be especially useful if the cover member is made of a rigid material, rather than a soft flexible material that is capable of being inverted to expose the entire cloth. In this manner, substantially the entire cloth may still be extended out of the cover member without the inversion thereof. Such an attachment point may also be used with a soft and flexible cover member. Moreover, in some aspects of the invention, the cloth may be attached to the cover member at an attachment point that is located on the outside thereof, rather than inside the opening. As can be appreciated by the illustrated example of FIG. 3, the cloth may be attached or coupled to the cover member at or about a corner portion and/or edge portion(s) of the cloth, whether at attachment point 30 or other attachment portions disclosed herein (e.g., like at or near the opening). As such, when in the non-inverted cover member position, the opening (and the enclosure having the cavity) is open and accessible when the cloth is extended out of the cloth member (e.g., this is because only a portion (e.g., a corner) of the cover member is attached to the cover member). Moreover, as shown on FIG. 3, an attachment point (e.g., 30, or any other disclosed attachment point) can be exposed (e.g., entirely or substantially exposed) when the cover member is in the inverted cover member position. As can also be appreciated by the illustrated example of FIG. 3, when in the inverted cover member position, the inside surface of the cover member is exposed (e.g., entirely or substantially exposed).

Permanent attachment mechanisms for the cloth 25 the cover member 10 may include gluing, stitching, melting, or otherwise fusing the cloth to the inside of the cover member at the desired attachment point 30. Removable attachment mechanisms may include without limitation, snaps, hook and loop fasteners (i.e. Velcro®), or buttons. As will be recognized, the removing mechanisms allow the cloth to be removed from the cover member for washing or other cleaning or treatment. Moreover, the removing mechanisms allow the cloth to be replace when worn out, or if damaged without the necessity of replacing the entire device. When the cover member is made of a soft and flexible material, the cloth may simply be extended out therefrom, as shown in FIG. 3, and the entire accessory placed in a washing machine, etc. in order to accomplishing cleaning or other treatment of the cloth.

In one aspect of the present invention, the cover member 10 may be an extension of the cloth 25 itself, which is configured to accommodate the rest of the cloth which is folded, rolled, or wadded, and secured inside. As will be recognized by those skilled in the art, a number of flap, sleeve, and pouch designs can be employed to achieve this embodiment. Further, in such an embodiment, the attachment member 20 and optional fastener are attached directly to the cover member portion of the cloth.

The present invention also encompasses methods for use of the device set forth herein. In one aspect, the present invention includes a method for cleaning or treating a lens-bearing device by providing a device as recited herein, orienting the cloth into the second configuration wherein the cloth is extended substantially out of the cover member, and contacting the lens of the lens-bearing device with the cloth in a manner sufficient to clean or treat the lens.

Numerous modifications and alternative arrangements may be devised by those skilled in the art without departing from the spirit and scope of the present invention and the present invention is intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the principles and concepts set forth herein.

What is claimed is:

1. A cloth accessory comprising:
   a cover member of a soft and flexible material forming an enclosure with an opening therein; and
   a cloth coupled to the cover member at a single attachment point, said attachment point closer to the opening than at a point on the cover member substantially opposite the opening, the cloth having a first configuration wherein the cloth is retracted substantially into the cover member and a second configuration wherein the cloth is extended substantially out of the cover member without becoming detached therefrom.

2. The cloth accessory of claim 1, wherein the soft and flexible material includes a fabric material.

3. The cloth accessory of claim 1, further comprising an attachment member coupled to the cover member configured to attach the cloth accessory to an object.

4. The cloth accessory of claim 3, wherein the attachment member comprises a cord.

5. The cloth accessory of claim 1, wherein the cloth is removably coupled to the cover member.

6. The cloth accessory of claim 1, wherein the cover member is a pouch.

7. The cloth accessory of claim 1, further comprising a fastener at the opening to substantially close the opening.

8. The cloth accessory of claim 7, wherein the fastener is a member selected from the group consisting essentially of: a button, a clasp, a draw string, a hook and loop fastener, a snap, a flap, and a zipper.

9. The cloth accessory of claim 8, wherein the fastener is a flap.

10. The cloth accessory of claim 8, wherein the fastener is a snap.

11. The cloth accessory of claim 1, wherein the cloth is absorbent.

12. The cloth accessory of claim 1, wherein the cloth comprises microfibers.

13. The cloth accessory of claim 1, wherein the cloth is coupled to the cover member inside the cover member.

14. The cloth accessory of claim 1, wherein the cloth is coupled to the cover member inside the cover member at a point adjacent to the opening of the cover member.

15. The cloth accessory of claim 1, wherein an inside surface of the cover member is exposed to the opening.

16. A cloth accessory comprising:
   a cover member of a soft and flexible material forming an enclosure with an opening therein;
   a cloth removeably coupled to the cover member at an attachment point closer to the opening than at a point on the cover member substantially opposite the opening, the cloth having a first configuration wherein the cloth is retracted substantially into the cover member and a second configuration wherein the cloth is extended substantially out of the cover member without becoming detached therefrom; and
   a removable attachment mechanism to removably couple the cloth and the cover member, the removable attachment mechanism comprising a snap, a hook and loop fastener, a button, or a combination thereof.

17. The cloth accessory of claim 1, wherein the soft and flexible material includes a fabric material.

18. The cloth accessory of claim 16, further comprising an attachment member coupled to the cover member configured to attach the cloth accessory to an object.

19. The cloth accessory of claim 18, wherein the attachment member comprises a cord.

20. The cloth accessory of claim 1, wherein the cover member is a pouch.

21. The cloth accessory of claim 1, further comprising a fastener at the opening to substantially close the opening.

22. The cloth accessory of claim 21, wherein the fastener is a member selected from the group consisting essentially of: a button, a clasp, a draw string, a hook and loop fastener, a snap, a flap, and a zipper.

23. The cloth accessory of claim 22, wherein the fastener is a flap.

24. The cloth accessory of claim 22, wherein the fastener is a snap.

25. The cloth accessory of claim 16, wherein the cloth is absorbent.

26. The cloth accessory of claim 16, wherein the cloth comprises microfibers.

* * * * *